US011476921B2

(12) United States Patent
Mohideen et al.

(10) Patent No.: US 11,476,921 B2
(45) Date of Patent: *Oct. 18, 2022

(54) SENDING ENVIRONMENTAL DATA ON AN UPLINK

(71) Applicant: Honeywell International Inc., Charlotte, NC (US)

(72) Inventors: Mohammed Ibrahim Mohideen, Bangalore (IN); Jan Bilek, Lovcicky (CZ)

(73) Assignee: Honeywell International Inc., Charlotte, NC (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/097,934

(22) Filed: Nov. 13, 2020

(65) Prior Publication Data

US 2021/0067241 A1 Mar. 4, 2021

Related U.S. Application Data

(63) Continuation of application No. 15/962,616, filed on Apr. 25, 2018, now Pat. No. 10,868,612.

(51) Int. Cl.
*H04B 7/185* (2006.01)
*H04L 67/12* (2022.01)

(52) U.S. Cl.
CPC ......... *H04B 7/18517* (2013.01); *H04L 67/12* (2013.01)

(58) Field of Classification Search
CPC ................................................ H04B 7/18517
See application file for complete search history.

(56) References Cited

U.S. PATENT DOCUMENTS 6,043,756 A 3/2000 Bateman et al.
6,256,004 B1 7/2001 Izumi et al.
(Continued)

FOREIGN PATENT DOCUMENTS

EP 2256957 A2 12/2010
EP 3136125 A1 3/2017

OTHER PUBLICATIONS

European Search Report issued in related EP 19170436, dated Sep. 13, 2019 (5 pages).

(Continued)

*Primary Examiner* — Guang W Li
(74) *Attorney, Agent, or Firm* — Bookoff McAndrews, PLLC

(57) ABSTRACT

A method for sending environmental data to a vehicle in transit is disclosed. The method is performed by a ground system. The method includes receiving new environmental data from a plurality of environmental data providers. The method also includes synthesizing an update template that identifies recommended portions of relevant data that are available to be uploaded for at least one of a plurality of environmental data services. The method also includes sending the update template to the vehicle using a low-bandwidth connection, wherein the update template is sent by the ground system without first receiving a request for the update template. The method also includes receiving, from the vehicle, a request for the recommended portions of relevant data. The method also includes sending the recommended portions of relevant data to the vehicle in an update package using a high-bandwidth connection.

20 Claims, 7 Drawing Sheets

(56) References Cited

U.S. PATENT DOCUMENTS

| | | |
|---|---|---|
| 7,027,898 B1 | 4/2006 | Leger et al. |
| 7,463,966 B2 | 12/2008 | Hollenbeck |
| 7,546,206 B1 | 6/2009 | Miller et al. |
| 7,808,377 B2 | 10/2010 | Shalaat et al. |
| 8,022,859 B2 | 9/2011 | Bunch et al. |
| 8,131,407 B1 | 3/2012 | Robinson |
| 8,412,446 B2 | 4/2013 | Miyawaki |
| 8,433,506 B2 | 4/2013 | Saggio et al. |
| 8,437,893 B2 | 5/2013 | Mead et al. |
| 8,629,788 B1 | 1/2014 | Greenleaf et al. |
| 8,924,137 B2 | 12/2014 | Chan et al. |
| 9,256,004 B2 | 2/2016 | Agarwal et al. |
| 9,418,562 B2 | 8/2016 | Frolik et al. |
| 9,535,158 B1* | 1/2017 | Breiholz ............ G01S 7/04 |
| 9,558,672 B2 | 1/2017 | McCann et al. |
| 9,691,288 B2 | 6/2017 | Agrawal |
| 10,424,196 B1* | 9/2019 | McEnroe ............ H04L 67/535 |
| 2010/0187591 A1 | 7/2010 | Nagashima |
| 2010/0269143 A1* | 10/2010 | Rabowsky ......... H04B 7/18591 725/63 |
| 2012/0101680 A1 | 4/2012 | Trepagnier et al. |
| 2013/0006512 A1* | 1/2013 | Saggio, III ........... G08G 5/0052 701/120 |
| 2013/0018536 A1 | 1/2013 | Cooper et al. |
| 2014/0136730 A1* | 5/2014 | Wahler ............... H04W 4/40 709/242 |
| 2014/0210644 A1 | 7/2014 | Breed |
| 2014/0306826 A1 | 10/2014 | Ricci |
| 2014/0309789 A1 | 10/2014 | Ricci |
| 2014/0309813 A1 | 10/2014 | Ricci |
| 2014/0309862 A1* | 10/2014 | Ricci .................. H04W 36/34 701/36 |
| 2014/0310379 A1 | 10/2014 | Ricci et al. |
| 2015/0304222 A1* | 10/2015 | Ko ..................... H04W 24/08 370/241 |
| 2016/0127934 A1* | 5/2016 | Lauer ................ H04B 7/18506 455/408 |
| 2016/0196132 A1 | 7/2016 | Searle et al. |
| 2016/0221575 A1 | 8/2016 | Posch et al. |
| 2016/0294605 A1* | 10/2016 | Searle ................. H04L 41/069 |
| 2016/0356922 A1 | 12/2016 | McCann et al. |
| 2017/0134087 A1* | 5/2017 | Law ................... H04B 7/18508 |
| 2017/0337068 A1* | 11/2017 | Maria ..................... H04W 4/02 |
| 2018/0322793 A1 | 11/2018 | Huang et al. |
| 2019/0053000 A1* | 2/2019 | Filippou .............. H04W 4/021 |
| 2019/0187971 A1* | 6/2019 | Wang ................... H04W 12/06 |
| 2019/0265965 A1* | 8/2019 | Acharya ............... G06F 8/658 |
| 2019/0324444 A1 | 10/2019 | Celia et al. |
| 2019/0333371 A1 | 10/2019 | Julian et al. |
| 2020/0027182 A1 | 1/2020 | Gullickson, III |
| 2020/0218531 A1* | 7/2020 | Kushwaha ............. G06F 8/66 |
| 2021/0114616 A1* | 4/2021 | Altman ........... H04W 36/00837 |

OTHER PUBLICATIONS

Bilek et al, "Automated Selection of Environmental Data Coverage", "U.S. Appl. No. 15/688,756 filed Aug. 28, 2017", pp. 1-25, Published in: US.

* cited by examiner

SENDING ENVIRONMENTAL DATA ON AN UPLINK

CROSS-REFERENCE TO RELATED APPLICATION(S)

This patent application is a continuation of and claims the benefit of priority to U.S. Non-provisional patent application Ser. No. 15/962,616, filed on Apr. 25, 2018, the entirety of which is incorporated herein by reference.

BACKGROUND

Various current and future aircraft systems rely on uplink data from a ground service to the aircraft. Such uplink data may face a significant limitation. Specifically, the data required by the applications may be large and therefore rely on usage of satellite connections for their transmission. However, for security reasons, such transmissions are triggered by a request from an aircraft with no possibility of data push from ground. To compensate, aircraft may check for relevant new data more frequently. However, most satellite connections are billed based on initiated minutes of connection, not by amount of transmitted data. Therefore each request by an aircraft would cost the same amount as the request with response containing the standard set of updated weather data. In other words, it may be cost-prohibitive for an aircraft to check for updated data with high frequency.

Accordingly, there is a need for systems and methods for communicating available updates to the aircraft in a timely and cost-effective manner.

SUMMARY

A method for sending environmental data to a vehicle in transit is provided. The method is performed by a ground system. The method includes receiving new environmental data from a plurality of environmental data providers. The method also includes synthesizing an update template that identifies recommended portions of relevant data that are available to be uploaded for at least one of a plurality of environmental data services. The method also includes sending the update template to the vehicle using a low-bandwidth connection, wherein the update template is sent by the ground system without first receiving a request for the update template. The method also includes receiving, from the vehicle, a request for the recommended portions of relevant data. The method also includes sending the recommended portions of relevant data to the vehicle in an update package using a high-bandwidth connection.

BRIEF DESCRIPTION OF THE DRAWINGS

Embodiments of the present invention can be more easily understood and further advantages and uses thereof more readily apparent, when considered in view of the description of the preferred embodiments and the following figures in which.

DETAILED DESCRIPTION

Figure 1:
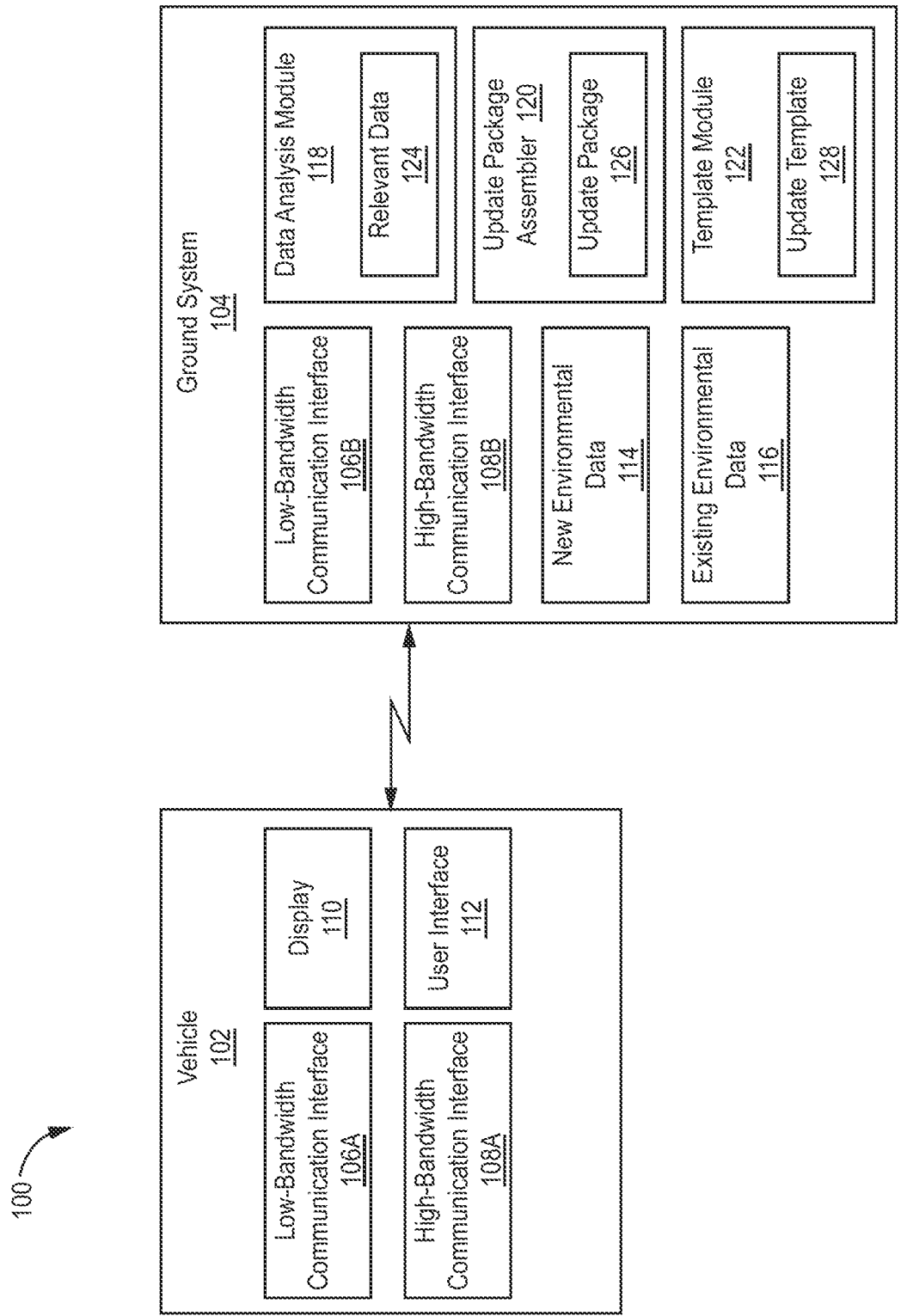
FIG. 1 is a block diagram illustrating an exemplary system for sending environmental data on an uplink.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for efficiently sending uplink data to a vehicle. For pedagogical purposes, the examples provided in the remaining portion of the specification may be written in terms of an aircraft. However, it is understood that the teachings of the present specification are also applicable to other vehicles on the land, air or sea, e.g., helicopters, space borne vehicles, automobiles, trucks, trains, ships, submarines, etc.

Additionally, the teachings of the present specification are also applicable to fixed/stationary systems, such as a stand-alone sensor or a system of sensors, e.g., on an oil rig. If implemented on a fixed/stationary system, the teachings of the present specification would use a defined area (e.g., polygon) surrounding the fixed/stationary system instead of a trajectory, route, or path of a vehicle. Therefore, the teachings of the present specification may be applicable to any system that relies on environmental data from a ground station.

Furthermore, the term environmental data includes, but is not limited to, meteorological or weather data, obstacles, temporary flight restrictions, airspace status, or other such information concerning the intended route of the vehicle, e.g., flight plan of the aircraft. Examples of weather data includes data relating to rain, snow, hail, lightning, volcanic ash, convective weather (e.g., turbulent weather), and/or weather that will likely cause icing on the vehicle such as super-cooled liquid water droplets. Examples of obstacles include animals (such as a flock of birds), other vehicles (e.g., drones, aircraft, etc.) or other debris.

Additionally, the terms area, cell, tile and polygon, when modified by the term "geographical," may be used interchangeably to describe a region of airspace above the earth's surface. For example, the sky surrounding the entire earth may be divided into a finite quantity of geographical areas/cells/tiles/polygons that are identified in any suitable way. Each geographical area/cell/tile/polygon may extend from the earth's surface up to the highest reasonable altitude that an aircraft can fly. Therefore, each geographical area/cell/tile/polygon may be thought of as a three-dimensional volume of airspace.

Additionally, where the specification refers to an intended trajectory, route, or path of a vehicle, a defined area (e.g., polygon) surrounding the vehicle may be used instead. For example, a defined area surrounding the vehicle may be used instead of a trajectory, route, or path when the vehicle's trajectory, route, or path is unavailable, unreliable, or outdated.

Aviation service providers (such as Honeywell International Inc.'s GoDirect Flight Services) may provide subscription-based services to aviation customers. These services may includes flight (route) planning and weather services (pre-flight and mid-flight). For example, a ground system may send existing environmental data to an aircraft during pre-flight operation, e.g., using Wi-Fi, cellular, or Bluetooth communication. The service provider may also provide mid-flight weather services that allow a pilot to request updated weather data from the ground system, i.e., using SATCOM. However, the SATCOM may be expensive to use.

Therefore, the present systems and methods may use a low-bandwidth connection (e.g. VHF ACARS) to notify an aircraft about a relevant set of information ready to be uploaded. The upload itself may then be performed using a high-bandwidth connection (e.g., satellite communication) in response to a request from the aircraft.

Another problem with weather updates for aircraft is that the pilot may be unable to make an informed decision about whether and when to request a weather update because the pilot does not have any indication about when there is relevant information to update. In other words, the pilot may not have enough information to decide whether there is a significant change in weather conditions to justify a relatively expensive update of weather data. The present systems and methods provide an update template to the pilot so that the pilot can make a more informed decision about whether and when to request updated weather data. For example, a template (sent over a low-bandwidth VHF ACARS connection) may inform the pilot which environmental data services, geographical cell(s) and/or altitude(s) have updates ready to be uploaded to the aircraft. Furthermore, the template may enable the pilot to selectively choose which updates to request for upload.

The present systems and methods may produce more relevant updates for the aircraft compared to conventional techniques of uploading data. Specifically, the relevancy of new weather data may be assessed within a ground system that has knowledge of each environmental data service, the flight plan of the aircraft, connection parameters, currently uplinked information on-board and recorded (or expected) position of the aircraft. This enables automatic assembly of the most relevant update data package for the aircraft, if desired.

In one configuration of the present systems and methods, a pilot may load existing weather data into the on-board system via Wi-Fi or other mobile connectivity means during pre-flight. As the flight progresses, a new set of weather data may be received at the ground system from various weather data providers. The ground system may process the new data set and identify updates relevant to the aircraft. As part of the mechanism to let aircraft crew know that new weather data is available for transmission, the ground system may perform certain additional steps that optimize the overall process. The additional steps may include identifying the most relevant products (out of many products for which new data is received at the ground) such that they can be packed within the optimal response size. The ground system may identify such information in the notification (e.g., update template) sent to the aircraft via VHF ACARS. The pilot may receive the notification and decide to trigger/request new transmission from the ground system. A weather data request dialog may be shown with geographical cell(s) and/or environmental data service(s) for which the updates have been identified by the ground system. The pilot may have an option to modify the proposed selection and send the request to the ground system. As a result, the pilot may receive the most relevant weather update for the flight at any point in time whether the pilot requests it or it is triggered by the ground system.

FIG. 1 is a block diagram illustrating an exemplary system 100 for sending environmental data on an uplink. The system 100 may include a vehicle 102 that communicates with ground system 104. The vehicle 102 may be an aircraft. As used herein, the term "uplink" refers to communications from the ground system 104 to the vehicle 102. Conversely, the term "downlink" refers to communications from the vehicle 102 to the ground system 104.

The vehicle 102 and the ground system 104 may each include a low-bandwidth communication interface 106A-B and a high-bandwidth communication interface 108A-B. The low-bandwidth communication interfaces 106 may be configured to communicate (send and/or transmit data) using very high frequency (VHF) radio transmissions. Specifically, the low-bandwidth communication interface 106 may be (or may be an element of) an Aircraft Communications Addressing and Reporting System (ACARS) operating in the VHF band, e.g., 108.00 to 117.95 MHz. The high-bandwidth communication interfaces 108 may be configured to communicate (send and/or transmit data) using satellite communications (SATCOM). The vehicle 102 and/or the ground system 104 may also include other communication interfaces (not shown), e.g., Wi-Fi, cellular, Bluetooth, etc.

In one example, the low-bandwidth communication interface 106A may be any ground-to-air communication interface capable of less than 50 Kbps maximum dedicated communication throughput. In this example, the high-bandwidth communication interface 108A may be any ground-to-air communication interface capable of greater than 50 Kbps maximum dedicated communication throughput. Alternatively, the low-bandwidth communication interface 106A may be defined as a communication interface capable of less than 5, 10, 15, 20, 25, 30 or 31.5 Kbps maximum dedicated communication throughput.

The low-bandwidth communication interfaces 106 and the high-bandwidth communication interfaces 108 may include circuitry configured to send and receive data. The circuitry may include inductive, capacitive, and/or resistive circuits that operate to perform one or more of the following operations: modulation/demodulation, interleaving/de-interleaving, encoding/decoding, mixing, upsampling/downsampling, transmitting, receiving, etc.

The ground station 104 may be implemented by one or more processors and/or as an element of a Global Data Center (GDC) that is operated by, or in conjunction with, a service provider. The service provider may provide subscription-based pre-flight and/or mid-flight services to aviation customers, e.g., flight planning and/or weather services (pre-flight and mid-flight). For example, the ground system 104 may send existing environmental data 116 to the vehicle 102 during pre-flight operation according to a subscription, e.g., using Wi-Fi or cellular communication. For example, the existing environmental data 116 may describe current weather conditions (along the flight path of an aircraft) for which the aircraft has subscribed.

The data provider may offer a variety of different environmental data services, each describing one or more types of weather conditions. In other words, the term "environmental data service" may refer to a subscription for data (or the data itself) relating to one or more particular types of environmental conditions, e.g., data relating to precipitation, clouds, wind, turbulence, icing, lightning, etc. Depending on the pilot's experience or the type of aircraft being flown, a pilot may subscribe to some or all the environmental data services. Then, the ground system 104 may update (and charge for) only the environmental data services that the pilot has subscribed to. The pilot may use the existing environmental data 116 when evaluating a flight plan before departure.

During mid-flight operation, the ground system 104 may receive new environmental data 114 for various environmental data services. For example, the ground system 104 may collect raw data from multiple different data providers, e.g., a meteorological department, satellite data, ground-based RADAR, on-board RADAR data from the vehicle 102 (or other vehicles), LIDAR, etc. Then, the ground system 104 may process the raw data into new environmental data 114 for one or more environmental data services.

In order to identify and recommend update data for the vehicle 102, the ground system 104 may use a data analysis module 118 to produce relevant data 124 from the new environmental data 114. Specifically, the data analysis module 118 may compare the new environmental data 114 with the existing environmental data 116 to determine what has changed. Additionally, the data analysis module 118 may determine whether the changes indicated by the new environmental data 114 occur along the intended route (e.g., flight path) of the vehicle 102. Therefore, the relevant data 124 may be a subset of the new environmental data 114 that describes changes from the existing environmental data 116 that occur along the intended route of the vehicle 102.

An update package assembler 120 may produce an update package 126 for the vehicle 102 based on the relevant data 124. The update package assembler 120 may use priority data to add portions of the relevant data 124 to the update package 126. Specifically, the update package assembler 120 may assess the impact that various updates will have on the travel (e.g., flight) of the vehicle 102. For example, the update package assembler 120 may use route data (including latitude, longitude, geographical cell(s) and/or altitude(s)). Portions of the relevant data 124 describing weather conditions directly in the flight path (and/or intended altitude) of the vehicle 102 may be assigned a higher priority than portions of the relevant data 124 describing weather conditions that are not directly in the flight path (and/or intended altitude) of the vehicle 102.

Furthermore, the update package assembler 120 may determine the severity of detected weather conditions (e.g., precipitation, clouds, wind, turbulence, icing, and/or lightning) in the relevant data 124. Alternatively, the update package assembler 120 may receive a severity determination from another module. In either case, the update package assembler 120 may use severity determinations to determine whether to include portions of the relevant data 124 into the update package 126. For example, relevant data 124 describing severe weather conditions (e.g., those conditions posing a relatively high safety risk to the vehicle 102) may be assigned higher priority than relevant data 124 describing less severe weather conditions (e.g., those conditions posing a relatively low safety risk to the vehicle 102). The severity determination may also increase the severity level for relevant data 124 describing weather conditions that are time-critical over relevant data 124 describing weather conditions that are not time-critical. Additionally, the severity determination may account for a confidence level associated with a detected weather condition, e.g., portions of the relevant data 124 describing weather conditions detected with a high degree of probability may be assigned a higher severity than weather conditions with a low degree of probability. For example, portions of the relevant data 124 describing a weather condition indicated by multiple sensor modalities may be considered more severe than portions of the relevant data 124 describing an equivalent weather condition that is indicated by a single sensor modality, assuming both weather conditions are otherwise similar.

Additionally, the update package assembler 120 may use pilot preferences to determine whether to include portions of the relevant data 124 into the update package 126. During pre-flight, the pilot may use a user interface 112 on a display 110 in the vehicle 102 to enter pilot preferences. For example, based on experience and/or type of vehicle 102, the pilot may select (or subscribe) to weather updates for certain environmental data services. The vehicle 102 may transmit these pilot preferences to the ground system 104 using a Wi-Fi, cellular, or Bluetooth connection.

During mid-flight operation, the ground system 104 may use the pilot preferences to selectively add portions of the relevant data 124 to the update package 126. For example, if the pilot has indicated a desire to receive updates relating to precipitation, the update package assembler 120 may assign a higher priority to portions of the relevant data 124 relating to precipitation, even portions with mild and/or moderate severity, when assembling the update package 126. As another example, if the pilot has not indicated a desire to receive updates relating to windy weather conditions, the update package assembler 120 may assign a lower priority to portions of the relevant data 124 relating to windy weather conditions when assembling the update package 126. Alternatively, in this example, the update package assembler 120 may not include portions of the relevant data 124 relating to windy weather conditions in the update package 126 unless they meet at least a minimum severity threshold.

The update package 126 may be a collection of data representing one or more weather conditions. For example, the update package 126 may include pixel or image data to be displayed on the display 110 of the vehicle 102. The update package 126 may include pixel or image data of the weather condition(s) for only the time period since the most recent update. Alternatively, the update package 126 may include cumulative pixel or image data for a larger time window.

In one configuration, a data size limit of the update package 126 may be configurable by the vehicle 102 or the ground system 104, e.g., based on throughput of the high-bandwidth connection. Alternatively, the data size limit of the update package 126 may be fixed at a predetermined size. The update package assembler 120 may iteratively include portions of the relevant data 124 into the update package 126, based on the priority data, until the data size limit is reached.

In one configuration, once the update package 126 has been assembled, the template module 122 may produce an update template 128 based on the update package 126. For example, the update template 128 may include only text descriptions of the portions of relevant data 124 included in the update package 126. This way, the update template 128 may identify which environmental data services have updates available, and for which geographical cell(s) and/or altitude(s). In other words, the update template 128 may recommend portions of the relevant data 124 (e.g., portions that are included in the update package 126) to the pilot based on other information available at the ground system 104. For example, each entry in the update template 128 may identify an environmental data service associated with a portion of relevant data 124, e.g., precipitation, clouds, wind, turbulence, icing, lightning, etc. Each entry in the update template 128 may also identify geographical cell(s) and/or an altitude(s) for the associated portion of relevant data 124. Each entry in the update template 128 may also identify a severity of the weather condition associated with the portion of relevant data 124. A severity identifier may use relative terms (e.g., low, medium, high), a numerical scale (e.g., 1-10), a color scale (e.g., green, yellow, red) and/or a greyscale intensity scale (e.g., light grey for low severity, dark grey for high severity).

Therefore, the update template 128 may provide the pilot with enough information to make an informed decision as to whether to request a weather update from the ground system 104. In other words, the update template 128 may indicate recommended relevant data 124 that is available to be uploaded for at least one of a plurality of environmental data services. However, since the update template 128 includes primarily text descriptions (instead of pixel or image data), the update template 128 may be a much smaller data size than the update package 126 itself, and suitable to send over the low-bandwidth communication interface 106.

The update template 128 may be sent from the ground system 104 to the vehicle 102 unsolicited. In other words, the update template 128 may be sent to the vehicle 102 without first receiving a request for it from the vehicle 102. The update template 128 may be sent periodically to the vehicle 102 or in response to a determination at the ground system 104 that updates related to highly severe weather conditions are available. Therefore, using the update template 128, the pilot may know which environmental data services have updates available for uplink (and for which geographical cell(s) and/or altitude(s)) when the pilot decides whether to request a weather update. The update template 128 may be sent on a low-bandwidth VHF ACARS connection.

In contrast to the update template 128, the update package 126 may only be sent from the ground system 104 to the vehicle 102 in response to a request from the vehicle 102. Specifically, the pilot may use the user interface 112 to request the update package 126 be sent on the uplink. In one configuration, the pilot may use the user interface 112 to selectively request a subset of the update package 126 described in the update template 128. For example, the pilot may request portions of the update package 126 relating to environmental data services listed in the update template 128. Additionally, the pilot may, using the user interface 112, request portions of the update package 126 relating to certain geographical cell(s) and/or altitude(s), but not others. Upon receiving a request from the vehicle 102 for it, the update package 126 (or portions of it indicated by the request) may be sent on a high-bandwidth SATCOM connection. Alternatively, the update package 126 may be triggered based on a determination by the ground system that a weather condition in the update package 126 is highly severe, e.g., in emergency situations.

In one configuration, the update template 128 may be determined directly from the new environmental data 114 and/or the relevant data 124. In other words, the template module 122 may determine the update template 128 without first assembling the update package 126. In this configuration, the template module 122 may use one or more of the following to create the update template 128: route data of the vehicle 102, priority data (e.g., pilot preferences, severity of identified weather conditions, and/or route data of the vehicle 102, e.g., geographical cell(s) and/or altitude(s).

Therefore, in this configuration, the template module 122 may operate similar to the update package assembler 120 described above, but it may assemble text descriptions of the highest priority portions of the relevant data 124 (or the new environmental data 114) directly into the update template 128 instead of including the actual portions of the relevant data 124 into the update package 126 first. In this configuration, the update template 128 may also be sent to the vehicle 102 on a low-bandwidth connection without first receiving a request from the vehicle 102.

Figure 2:
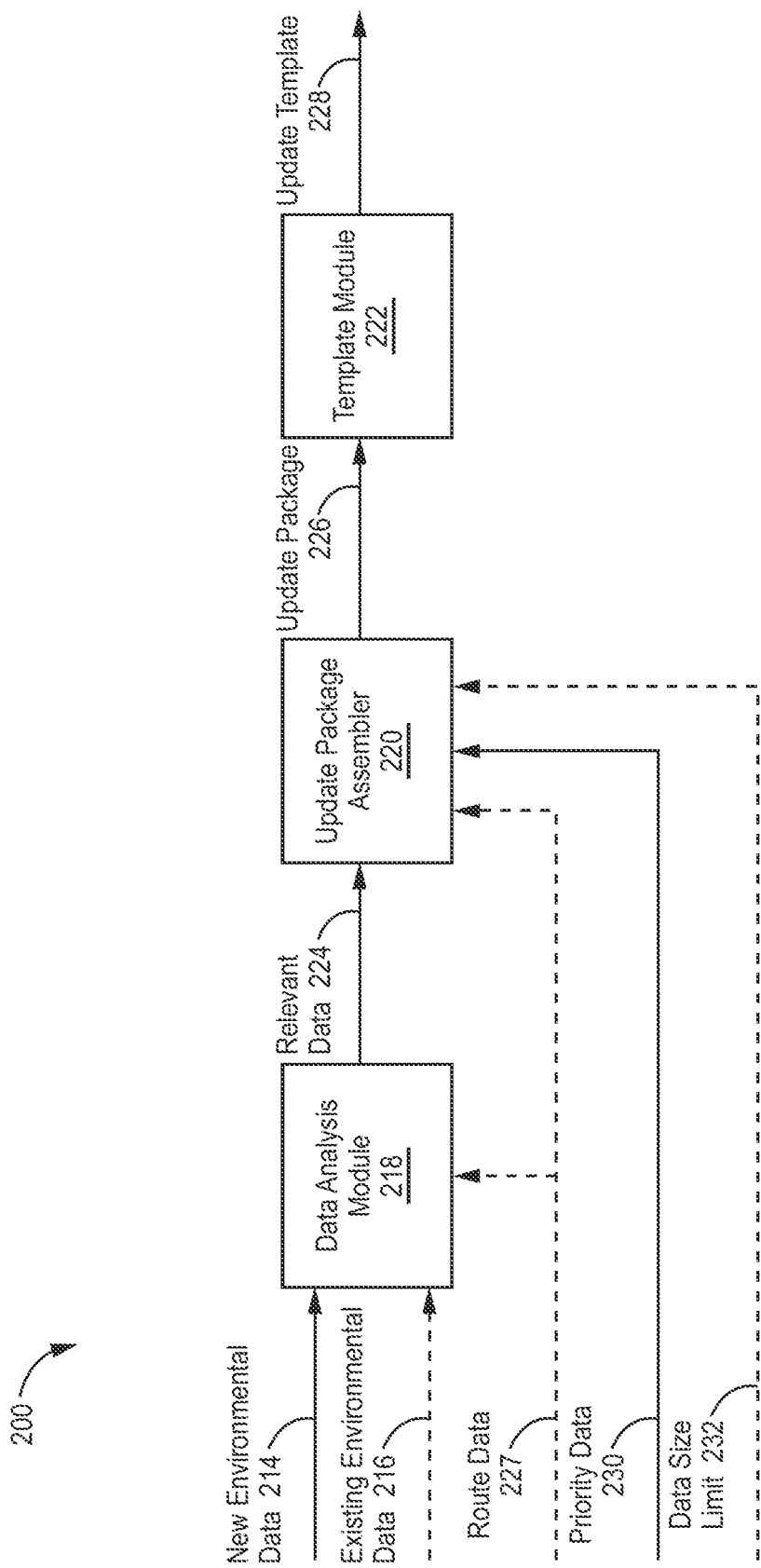
FIG. 2 is a block diagram illustrating an exemplary system for determining an update package and an update template.

FIG. 2 is a block diagram illustrating an exemplary system 200 for determining an update package 226 and an update template 228. The system 200 may be included in a ground system 104 that communicates with a vehicle 102. Specifically, the ground system 104 may send the update template 228 produced by the system 200 to inform a pilot of the vehicle 102 about update information (e.g., an update package 226) that is available to be uploaded for one or more environmental data services.

The system 200 may include a data analysis module 218 that produces relevant data 224, an update package assembler 220 that produces an update package 226, and a template module 222 that produces an update template 228. As illustrated, the template module 222 may produce the update template 228 using the update package 226 as input. However, in another configuration (not shown), the template module 222 may produce the update template 228 directly from the new environmental data 214 and/or the relevant data 224.

In operation, the data analysis module 218 may receive the new environmental data 214 and, optionally, existing environmental data 216 and/or route data 227 of the vehicle 102. The existing environmental data 216 may be weather data up to, and including, the most recent weather update to the vehicle 102. If the vehicle 102 has not received a weather update mid-flight, the existing environmental data 216 may be weather data that was sent to the vehicle 102 pre-flight. The route data 227 may include information that identifies a flight path and/or altitude of the vehicle 102. Instead of route data 227, data defining an area (e.g., polygon) surrounding the current location of the vehicle 102 may be used.

The data analysis module 218 may compare the new environmental data 214 with the existing environmental data 216 to determine what has changed. Additionally, the data analysis module 218 may use the route data 227 to determine whether the changes indicated by the new environmental data 214 occur along the intended route (e.g., the flight path) of the vehicle 102. In other words, the data analysis module 218 may produce relevant data 224 that identifies changes from the existing environmental data 116 occurring in the flight path of the vehicle 102.

The update package assembler 220 may prioritize which portions of the relevant data 224 are included in an update package 226. The update package assembler 220 may use priority data 230, optional route data 227, and/or an optional data size limit 232 to produce the update package 226. The priority data 230 may include severity determination(s) for detected weather condition(s) (e.g., precipitation, clouds, wind, turbulence, icing, and/or lightning) and/or pilot preferences. The pilot preferences may be downloaded from the vehicle 102 to the ground system 104 pre-flight or mid-flight and may indicate the environmental data services that the pilot subscribes to. The route data 227 may include geographical cells (polygons) and/or altitude(s) that the vehicle 102 plans on travelling through. The data size limit 232 may be configurable or not.

Therefore, the update package assembler 220 may prioritize, and iteratively include in the update package 226, portions of the relevant data 224 based on one or more of the following: severity determination(s) of portions of the relevant data 224, pilot preferences, route data 227, and the data size limit 232. For example, the update package assembler 220 may prioritize a portion of the relevant data 224 corresponding to a high severity weather condition over portions corresponding to medium or low severity weather conditions. Similarly, the update package assembler 220 may prioritize a portion of the relevant data 224 corresponding to a weather condition directly in the intended route (e.g., flight path) of the vehicle over portions corresponding to weather conditions that are not directly in the intended route (e.g., flight path) of the vehicle. Similarly, the update package assembler 220 may prioritize a portion of the relevant data 224 corresponding to a weather condition that the pilot has subscribed to over portions corresponding to weather conditions that the pilot has not subscribed to. Additionally, when the update package 226 is almost full, the update package assembler 220 may prioritize a portion of the relevant data 224 that is small enough to fit in the remaining space of the update package 226 over portions that are too large to fit in the remaining space of the update package.

In one configuration (illustrated in FIG. 2), the template module 222 may receive the update package 226 and produce an update template 228. The update template 228 may include primarily text descriptions of the information included in the update package 126 (instead of pixel or image data). Specifically, the update template 228 may identify which environmental data services have updates available, and for which geographical cell(s) and/or altitude(s). For example, each entry in the update template 228 may identify an environmental data service associated with a portion of relevant data 224, e.g., precipitation, clouds, wind, turbulence, icing, lightning. Each entry in the update template 228 may also identify geographical cell(s) and/or an altitude(s) for the associated portion of relevant data 224. Each entry in the update template 228 may also identify a severity of the weather condition associated with the portion of relevant data 224.

In another configuration (not shown), the template module 222 may determine the update template 228 directly from the new environmental data 214 and/or the relevant data 224. In other words, the template module 222 may determine the update template 228 without first assembling the update package 226. Therefore, in this configuration, the template module 222 may additionally include some of the functionality of the update package assembler 220 described above. However, unlike the update package assembler 220, the template module 222 may include text descriptions of the highest priority portions of the relevant data 224 (or the new environmental data 214) directly into the update template 228 instead of including the actual portions of the relevant data 224 into the update package 226 first.

The update template 228 may be sent unsolicited to the vehicle 102 while the update package 226 may be sent only in response to a request from the vehicle 102. The update template 228 may be transmitted via a VHF ACARS link while the update package 226 may be transmitted via a SATCOM link. The system 200 may determine an update package 226 and/or an update template 228 for each vehicle 102 that it services.

Figure 3:
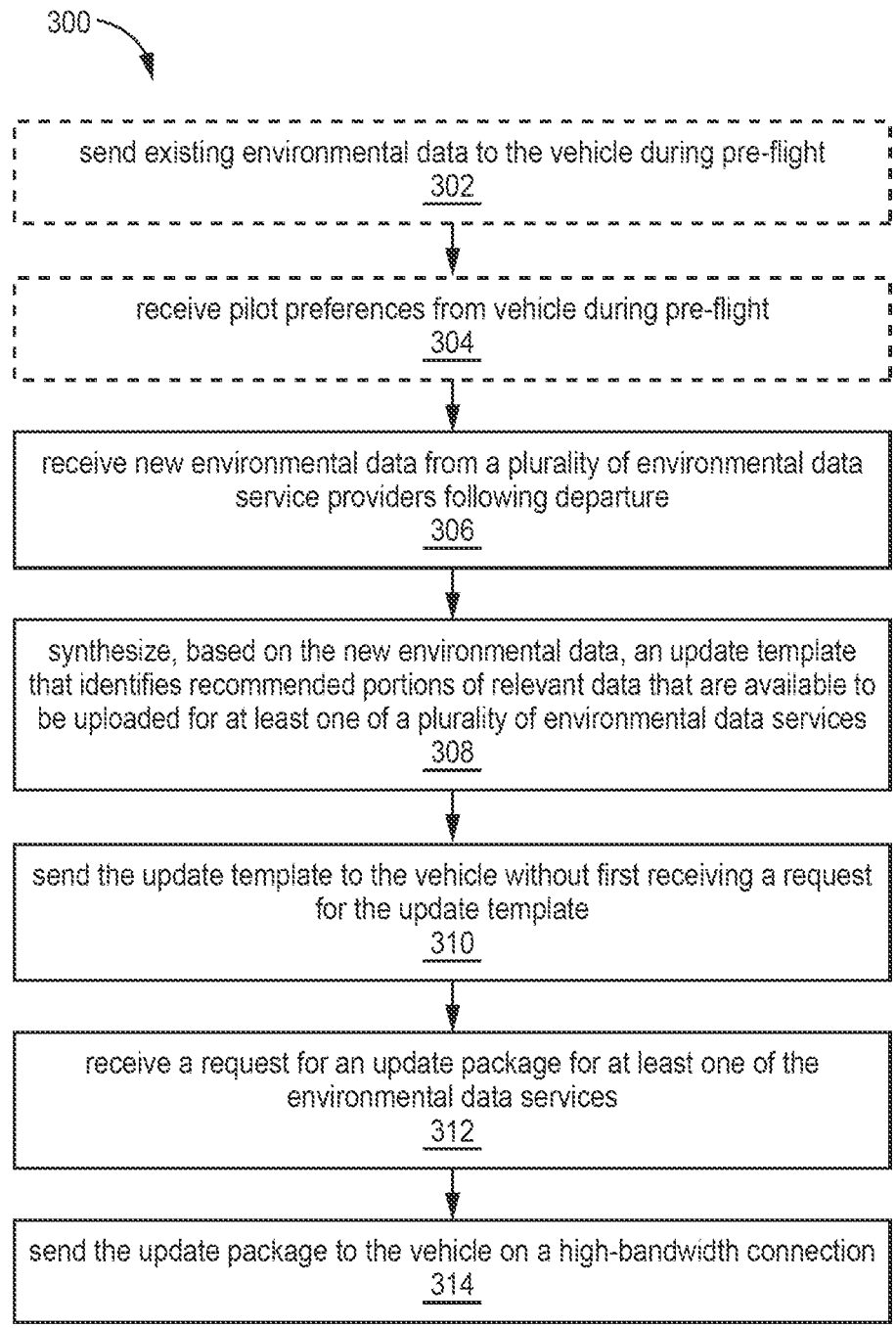
FIG. 3 is a flow diagram illustrating an exemplary method for sending environmental data on an uplink.

FIG. 3 is a flow diagram illustrating an exemplary method 300 for sending environmental data on an uplink. The method 300 may be performed by a ground system 104 communicating with one or more vehicles 102.

The ground system 104 may optionally send 302 existing environmental data to the vehicle during pre-flight, e.g., using a Wi-Fi, cellular, or Bluetooth link. The ground system 104 may also optionally receive 304 pilot preferences from vehicle during pre-flight. The pilot preferences may indicate which environmental data services, geographical cell(s), and/or altitude(s) the pilot would like to receive updates for. Using a user interface 112, a pilot may select one of multiple pre-defined pilot preference settings or may create a new set of preferences. The ground system 104 may also receive 306 new environmental data 114 from a plurality of environmental data service providers following departure, e.g., from a meteorological department, satellite data, ground-based RADAR, on-board RADAR data from the vehicle 102 or other vehicles, LIDAR, etc.

The ground system 104 may also synthesize 308, based on the new environmental data 114, an update template 128 that identifies recommended portions of relevant data 124 that are available to be uploaded (i.e., in an update package 126) for at least one of a plurality of environmental data services. For example, each entry in the update template 128 may identify an environmental data service for an associated portion of relevant data 124, e.g., precipitation, clouds, wind, turbulence, icing, lightning. Each entry in the update template 128 may also identify geographical cell(s) and/or an altitude(s) for the associated portion of relevant data 124. Each entry in the update template 128 may also include a severity of the weather condition associated with the portion of relevant data 124.

The ground system 104 may also send 310 the update template 128 (unsolicited) to the vehicle 102 without first receiving a request for the update template 128. The ground system 104 may send 310 the update template to the vehicle using a low-bandwidth connection, e.g., VHF ACARS.

In response to receiving the update template 128 from the ground system 104, the vehicle 102 may display the update template 128 on a display 110. Then, using a user interface 112, the pilot may scroll through the update template 128 and select some or all of the available updates identified in the update template 128. Once the pilot has made the selection(s), the in-vehicle system (e.g., ACARS) may generate a request for the selected updates. For example, the pilot may request only a subset of the available updates indicated by the update template 128. The vehicle 102 may send the request to the ground system 104 using a low-bandwidth communication interface 106 or a high-bandwidth communication interface 108, e.g., VHF ACARS, high frequency (HF) ACARS, or SATCOM depending on the location of the vehicle 102 and available coverage.

In response to receiving 312 the request for an update package 126, the ground system 104 may send 314 the update package to the vehicle 102 on a high-bandwidth connection, e.g., SATCOM.

Figure 4:
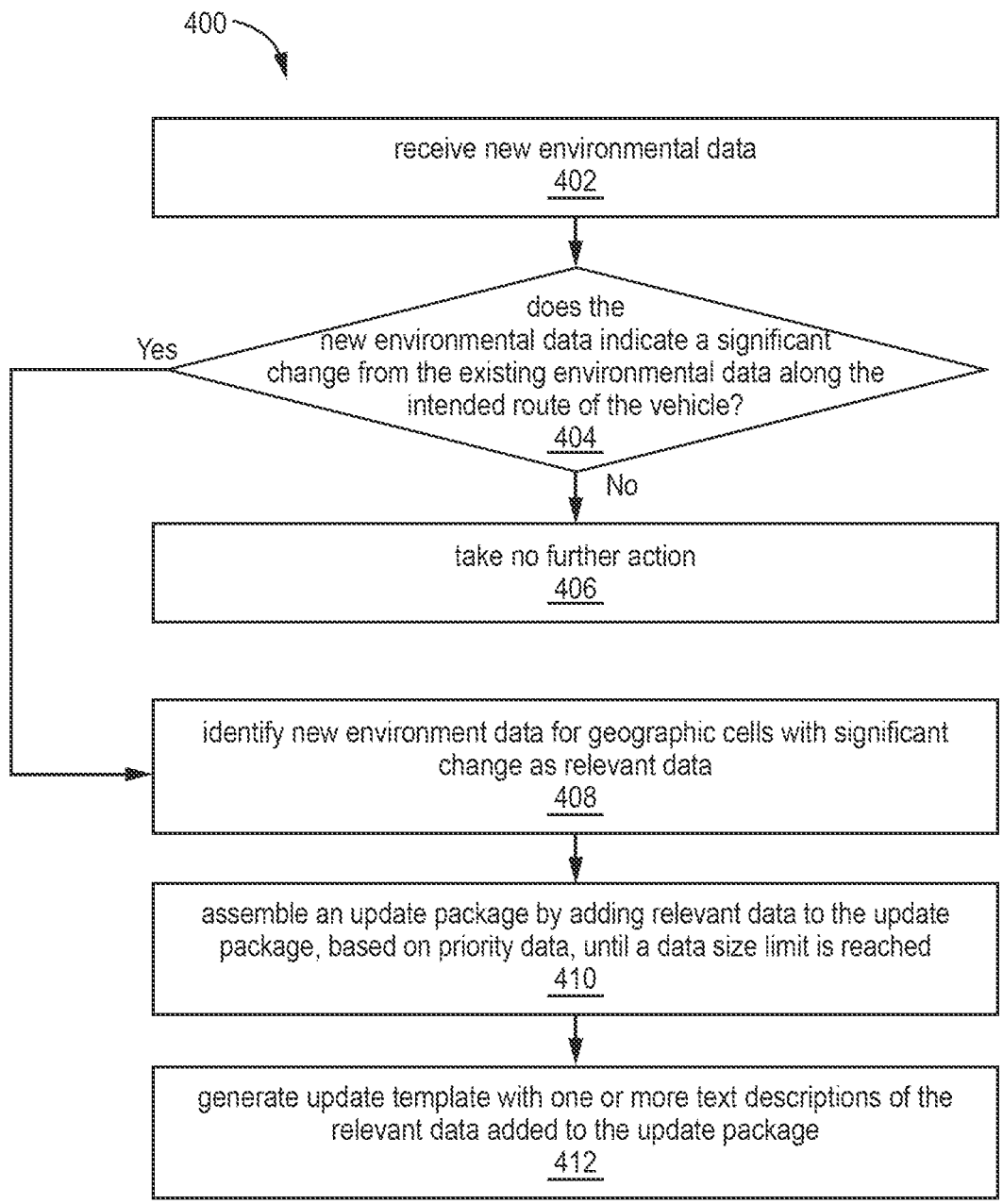
FIG. 4 is a flow diagram illustrating an exemplary method for synthesizing an update template.

FIG. 4 is a flow diagram illustrating an exemplary method 400 for synthesizing an update template 128. In other words, the method 400 illustrated in FIG. 4 may, in part, describe a more detailed configuration of element 308 illustrated in the method 300 of FIG. 3. The method 400 may be performed by a ground system 104 communicating with one or more vehicles 102. The method 400 may be performed periodically by the ground system 104 for every uplink-equipped aircraft served by the ground station 104. Alternatively, the ground system 104 may perform the method 400 for a particular vehicle 102 based on a high severity determination for a weather condition affecting the particular aircraft.

After the ground system 104 receives 402 new environmental data 114, the ground system 104 may determine 404 whether the new environmental data 114 indicates a significant change from the existing environmental data 116 along the intended route of the vehicle 102. In other words, the ground system 104 may determine whether the new environmental data 114 includes any relevant data 124. The threshold for whether a change is significant enough to justify synthesizing (and sending) an update template 128 may be whether an identified weather condition has at least a minimum severity level, e.g., medium or high. Alternatively, or additionally, the threshold for whether a change is significant enough to justify synthesizing (and sending) an update template may be whether a weather condition is within a certain distance and/or altitude proximity to the intended route (e.g., flight path) of the vehicle 102.

If the new environmental data 114 indicates there is no significant change from the existing environmental data 116 along the intended route of the vehicle 102 (i.e., there is no relevant data 124), the ground system 104 may take 406 no further action to synthesize an update template 128. For example, the ground system 104 may not synthesize an update template 128 if no weather condition indicated by the new environmental data 114 has at least a minimum severity level and/or proximity to the flight plan of the vehicle 102.

Alternatively, if the new environmental data 114 indicates there is a significant change from the existing environmental data 116 along the intended route of the vehicle 102, the ground system 104 may identify 408 the new environmental data 114 for geographical cells with significant change as relevant data 124.

The ground system 104 may also assemble 410 an update package 126 by adding relevant data to the update package 126, using priority data, until a data size limit is reached. For example, an update package assembler 120 may use priority data, optional route data, and/or an optional data size limit to produce the update package 126. The priority data may include the severity of a detected weather condition (e.g., precipitation, clouds, wind, turbulence, icing, and/or lightning) and/or pilot preferences. The pilot preferences may indicate the environmental data services that the pilot subscribes to. The route data may include geographical cells (polygons) and/or altitude(s) that the vehicle 102 plans on travelling through. The data size limit may be configurable or not.

The ground system 104 may also generate 412 an update template 128 with one or more text descriptions of the portions of relevant data 124 that were added to the update package 126. For example, each entry in the update template 128 may identify an environmental data service associated with a portion of relevant data 124, e.g., precipitation, clouds, wind, turbulence, icing, lightning, etc. Each entry in the update template 128 may also identify geographical cell(s) and/or an altitude(s) for the associated portion of relevant data 124. Each entry in the update template 128 may also identify a severity of the weather condition associated with the portion of relevant data 124.

The ground system 104 may send the update template 128 to the vehicle 102 unsolicited, i.e., the ground system 104 may send the update template 128 to the vehicle 102 without first receiving a request for it from the vehicle 102. The update template 128 may be sent periodically to the vehicle 102 or based on a determination that updates related to highly severe weather conditions are available. The update template 128 may be sent on a low-bandwidth VHF ACARS connection.

Figure 5:
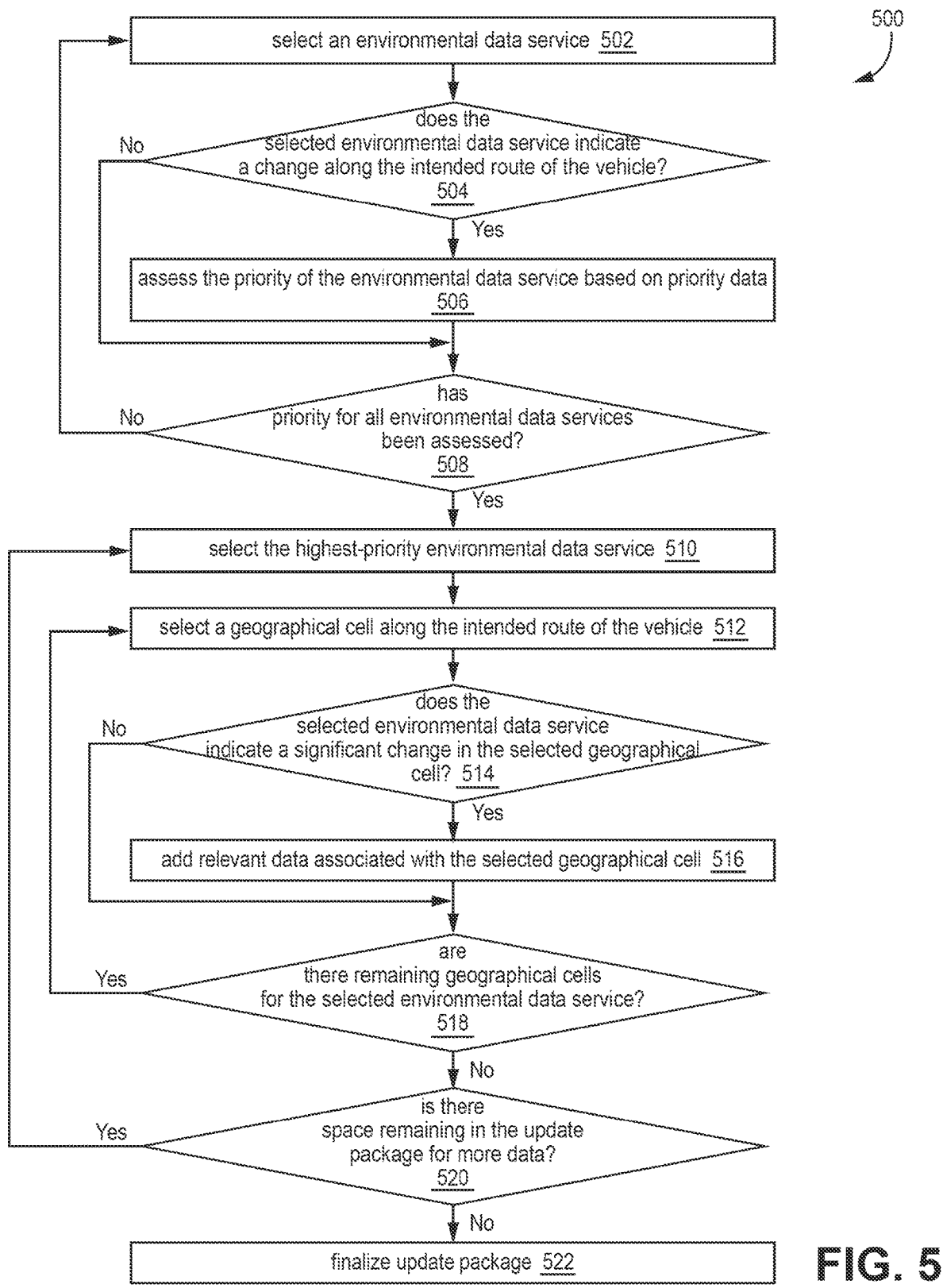
FIG. 5 is a block diagram illustrating an exemplary method for assembling an update package.

FIG. 5 is a block diagram illustrating an exemplary method 500 for assembling an update package 126. In other words, the method 500 illustrated in FIG. 5 may, in part, describe a more detailed configuration of element 410 illustrated in the method 400 of FIG. 4. The method 500 may be performed by a ground system 104 communicating with one or more vehicles 102.

FIG. 5 and associated description may refer to assessing the priority of an environmental data service. It should be understood that assessing the priority of an environmental data service includes assessing the priority of data (e.g., one or more portions of the relevant data 124) relating to the environmental data service.

Steps 502-508 of the method 500 may iteratively assess the priority of the different environmental data services. Specifically, the ground system 104 may select 502 an environmental data service. The ground system 104 may determine 504 whether the selected environmental data service indicates significant change(s) along an intended route of the vehicle 102. If the selected environmental data service does not indicate significant change(s) along the intended route of the vehicle 102, the ground system 104 does not need to assess the priority of the environmental data service.

However, if the selected environmental data service indicates significant change(s) along the intended route of the vehicle 102, the ground system 104 may assess 506 the priority of selected environmental data service based on priority data.

For example, the ground system 104 may use a severity determination to assess 506 the priority of the selected environmental data service, e.g., portions of relevant data 124 relating to severe weather conditions may be given higher priority than portions of relevant data 124 relating to weather conditions that are less severe.

Additionally, or alternatively, the ground system 104 may use pilot preferences to assess 506 the priority of the selected environmental data service. For example, if the pilot has indicated a desire to receive updates relating to a particular environmental data service (e.g., lightning), portions of relevant data 124 relating to the particular environmental data service may be given higher priority than portions of relevant data 124 relating to other environmental data services, all else being equal.

Whether or not the selected environmental data service indicates significant changes along the intended route of the vehicle 102, the ground system 104 may determine 508 whether priority for all environmental data services has been assessed. If there are unassessed environmental data services, a new environmental data service may be selected 502 and priority assessed 506 (assuming the environmental data service indicates a significant change along the intended route of the vehicle 102).

Steps 510-520 of the method 500 may then iteratively assemble the update package 126 based on the priority determinations. Specifically, if the priority of all environmental data services has been assessed, the ground system 104 may select 510 the environmental data service with the highest priority from among the environmental data services that have not been selected yet (i.e., from among the unprocessed environmental data services). For the selected environmental data service, the ground system 104 may select 512 a geographical cell along the intended route (e.g., geographical cell(s) and/or altitude(s)) of the vehicle 102.

The ground system 104 may determine 514 whether the selected environmental data service indicates a significant change in the selected geographical cell.

The threshold for whether a change is "significant" may be whether a detected weather condition in the selected geographical cell has at least a minimum severity level, e.g., medium or high. Alternatively, or additionally, the threshold for whether a change is significant may be whether a detected weather condition is within a certain distance and/or altitude proximity to the intended route (e.g., flight path) through the selected geographical cell (or whether a detected weather condition is within a certain distance and/or altitude proximity to the current location of the vehicle).

If the selected environmental data service does not indicate a significant change in the selected geographical cell, the ground system 104 may determine 518 whether there are any remaining geographical cells for the selected environmental data service. If the selected environmental data service indicates a significant change in the selected geographical cell, the ground system 104 may add 516 portions of the relevant data 124 associated with the selected geographical cell and the selected environmental data service to an update package 126. The ground system 104 may then determine 518 whether there are any remaining geographical cells for the selected environmental data service, i.e., any geographical cells along the intended route of the vehicle 102 that haven't been examined for significant changes.

If there are remaining geographical cells for the selected environmental data service, the ground service 104 may select 512 a new geographical cell along the intended route of the vehicle 102. If there aren't any remaining geographical cells for the selected environmental data service, the ground service 104 may determine 520 whether there is space remaining in the update package 126 for more data. This may include determining whether the smallest portion of relevant data 124 (not already included in the update package 126) can fit in the space remaining in the update package 126.

If there is space remaining for more data, the ground system 104 may select 510 the next highest-priority environmental data service. If there is no more space remaining for more data, the ground system 104 may finalize 522 the update package 126.

By iteratively assembling the update package 126 using the method 500 of FIG. 5, the ground system 104 may ensure that updates for the most relevant geographical cells for the most relevant environmental data services are included in the finite space allotted for the update package 126.

Figure 6:
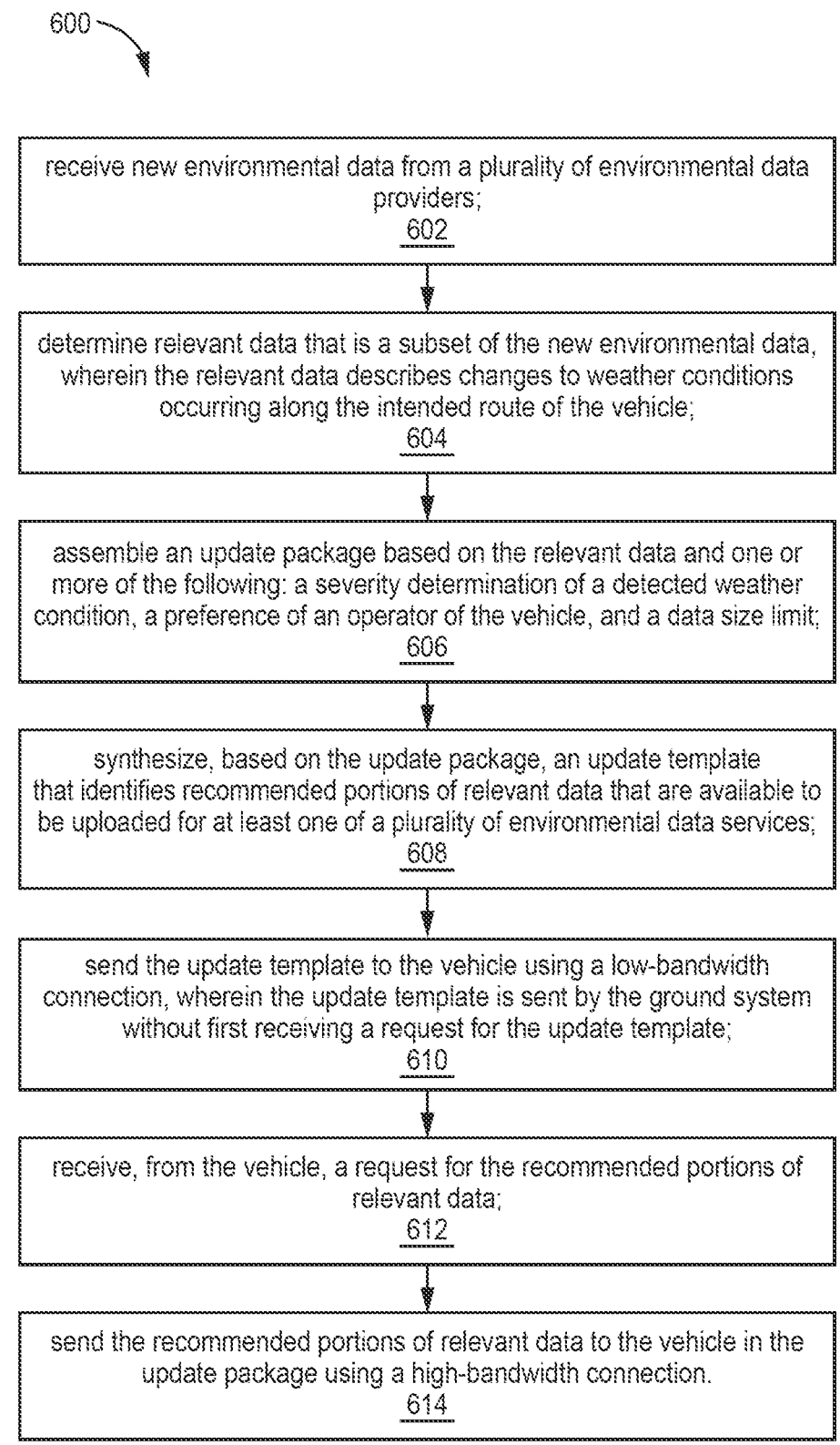
FIG. 6 is a flow diagram illustrating an exemplary method for sending environmental data on an uplink.

FIG. 6 is a flow diagram illustrating an exemplary method 600 for sending environmental data on an uplink. The method 600 may be performed by a ground system 104 communicating with one or more vehicles 102. The method 600 may be performed periodically by the ground system 104 for every uplink-equipped aircraft served by the ground station 104. Alternatively, the ground system 104 may perform the method 400 for a particular vehicle 102 based on a high severity determination for a weather condition affecting the particular aircraft.

During mid-flight, the ground system 104 may receive 602 new environmental data from a plurality of environmental data providers. The ground system 104 may determine 604 relevant data 124 that is a subset of the new environmental data 114. Specifically, the relevant data 124 may be data that indicates a significant change from the existing environmental data 116 along the intended route of the vehicle 102.

The ground system 104 may assemble 606 an update package 126 based on the relevant data and one or more of the following: a severity determination of a detected weather condition, a preference of an operator of the vehicle, and a data size limit. For example, the ground system 104 may use severity determination(s) to determine whether to include portions of the relevant data 124 into the update package 126. For example, relevant data 124 describing severe weather conditions (e.g., those conditions posing a relatively high safety risk to the vehicle 102, time-critical conditions, etc.) may be assigned higher priority than relevant data 124 describing less severe weather conditions (e.g., those conditions posing a relatively low safety risk to the vehicle 102, non-time critical conditions, etc.).

Additionally, the ground system 104 may use the pilot preferences to selectively add portions of the relevant data 124 to the update package 126. For example, if the pilot has indicated a desire to receive updates relating to first type of weather condition, the ground system 104 may assign a higher priority to portions of the relevant data 124 relating to the first type of weather condition, even portions with mild and/or moderate severity, when assembling the update package 126. As another example, if the pilot has not indicated a desire to receive updates relating to a second type of weather condition, the ground system 104 may assign a lower priority to portions of the relevant data 124 relating to the second type of weather condition when assembling the update package 126.

In one configuration, a data size limit of the update package 126 may be configurable by the vehicle 102 or the ground system 104, e.g., based on throughput of the high-bandwidth connection. Alternatively, the data size limit of the update package 126 may be fixed at a predetermined size. The ground system 104 may iteratively include portions of the relevant data 124 into the update package 126, based on the priority data, until the data size limit is reached.

The ground system 104 may also synthesize 608, based on the update package 126, an update template 128 that identifies portions of the relevant data 124 that are available to be uploaded for at least one of a plurality of environmental data services. For example, each entry in the update template 128 may identify an environmental data service associated with a portion of relevant data 124, geographical cell(s) and/or an altitude(s) associated with the portion of relevant data 124, and/or a severity of the weather condition associated with the portion of relevant data 124.

The ground system 104 may also send 610 the update template 128 to the vehicle 102 using a low-bandwidth connection, e.g., VHF ACARS. The update template 128 may be sent by the ground system 104 without first receiving a request for the update template 124.

The ground system 104 may also receive, from the vehicle 102, a request for the recommended portions of relevant data 124. The request for the recommended portions of relevant data 124 may be received on the low-bandwidth connection or a high-bandwidth connection.

In response to the request for the recommended portions of relevant data 124, the ground system may send 614 the recommended portions of relevant data to the vehicle 102 in the update package 126 using the high-bandwidth connection, e.g., SATCOM.

Computer System Overview

Configurations of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Figure 7:
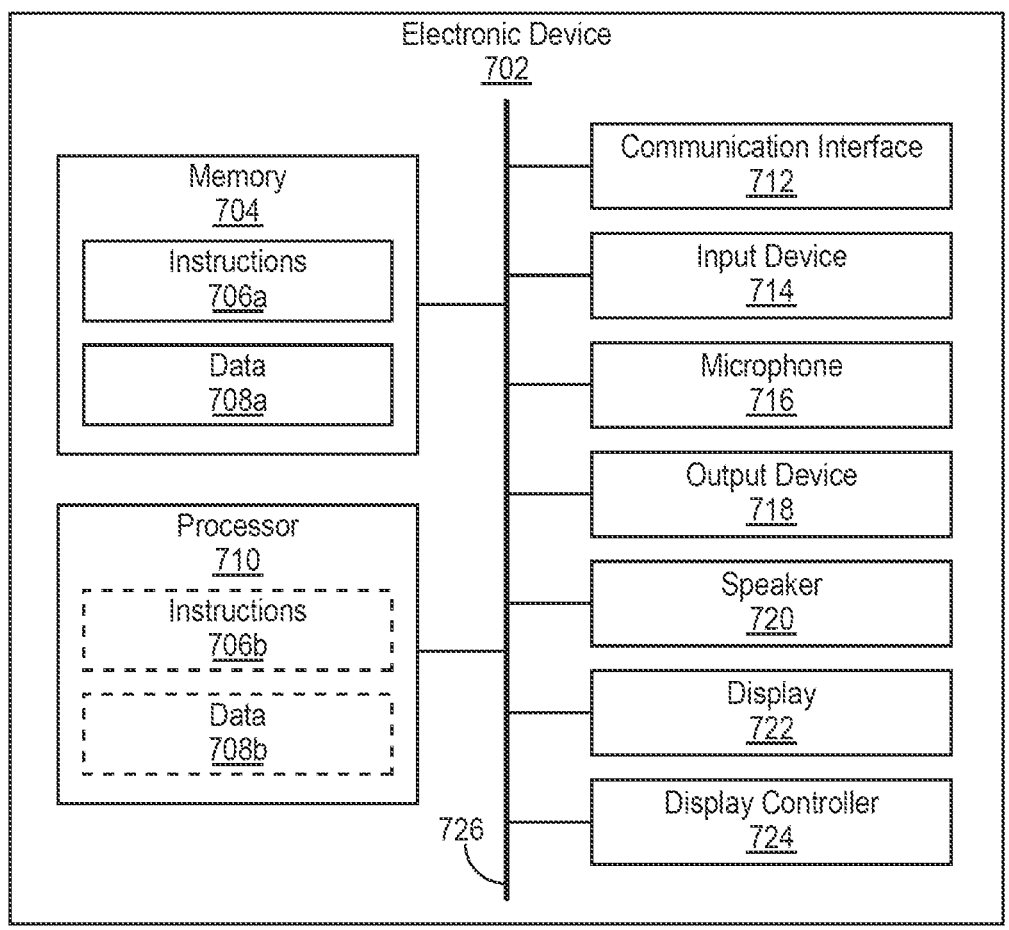
FIG. 7 is a block diagram illustrating an example of an electronic device that may be utilized in some configurations of the present disclosure.

As such, FIG. 7 is a block diagram illustrating an example of an electronic device that may be utilized in some configurations of the present disclosure. The illustrated components may be located within the same physical structure or in separate housings or structures. The vehicle 102 and/or ground system 104 described above may utilize one or more of the electronic devices 702 described in FIG. 7. The electronic device 702 includes a processor 710. The processor 710 may be a general purpose single- or multi-chip microprocessor (e.g., an ARM), a special purpose microprocessor (e.g., a digital signal processor (DSP)), a microcontroller, a programmable gate array, a Field Programmable Gate Array (FGPA), an application specific integrated circuit (ASIC), etc. The processor 710 may be referred to as a central processing unit (CPU). Although just a single processor 710 is shown in the electronic device 702 of FIG. 7, in an alternative configuration, a combination of processors (e.g., an ARM and DSP) could be used.

The electronic device 702 also includes memory 704 in electronic communication with the processor 710. That is, the processor 710 can read information from and/or write information to the memory 704. The memory 704 may be any electronic component capable of storing electronic information. The memory 704 may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), digital video discs (DVDs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

Data 708a and instructions 706a may be stored in the memory 704. The instructions 706a may include one or more programs, routines, sub-routines, functions, procedures, etc. The instructions 706a may include a single computer-readable statement or many computer-readable statements. The instructions 706a may be executable by the processor 710 to implement one or more of the methods, functions and procedures described above. Executing the instructions 706a may involve the use of the data 708a that is stored in the memory 704. FIG. 7 shows some instructions 706b and data 708b being loaded into the processor 710 (which may come from instructions 706a and data 708a).

The electronic device 702 may also include one or more communication interfaces 712 for communicating with other electronic devices. The communication interfaces 712 may be based on wired communication technology, wireless communication technology, or both. Examples of different types of communication interfaces 712 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 702 may also include one or more input devices 714 and one or more output devices 718, e.g., used in conjunction with a user interface. Examples of different kinds of input devices 714 include a keyboard, mouse, microphone, camera remote control device, button, touchscreen, etc. For instance, the electronic device 702 may include one or more microphones 716 that convert acoustic signals (e.g., voice, speech) into electrical or electronic signals. In another example, a camera may track position and/or motion of an object and convert the image(s)/video into instructions to control other devices.

Examples of different kinds of output devices 718 include a speaker, printer, etc. For instance, the electronic device 702 may include one or more speakers 720. In one configuration, a speaker 720 may be a transducer that converts electrical or electronic signals into acoustic signals. One specific type of output device which may be typically included in an electronic device 702 is a display device 722. Display devices 722 used with configurations disclosed herein may utilize any suitable image projection technology, such as a cathode ray tube (CRT), liquid crystal display (LCD), light-emitting diode (LED), organic light-emitting diode (OLED), gas plasma, electroluminescence, or the like. A display controller 724 may also be provided, for converting data stored in the memory 704 into text, graphics, and/or moving images (as appropriate) shown on the display device 722.

The various components of the electronic device 702 may be coupled together by one or more buses, which may include a power bus, a control signal bus, a status signal bus, a data bus, etc. For simplicity, the various buses are illustrated in FIG. 7 as a bus system 726. Furthermore, various other architectures and components may be utilized in connection with any electronic device described herein.

Terminology

Brief definitions of terms, abbreviations, and phrases used throughout this application are given below.

The term "determining" may include calculating, computing, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on".

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

Also, for the sake of illustration, various configurations of the present disclosure have herein been described in the context of computer programs, physical components, and logical interactions within modern computer networks. Importantly, while these configurations describe various configurations of the present disclosure in relation to modern computer networks and programs, the method and apparatus described herein are equally applicable to other systems, devices, and networks as one skilled in the art will appreciate. As such, the illustrated applications of the configurations of the present disclosure are not meant to be limiting, but instead are examples. Other systems, devices, and networks to which configurations of the present disclosure are applicable include, for example, other types of communication and computer devices and systems. More specifically, configurations are applicable to communication systems, services, and devices such as cell phone networks and compatible devices. In addition, configurations are applicable to all levels of computing from the personal computer to large network mainframes and servers.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

In conclusion, the present disclosure provides novel systems, methods, and arrangements for sending environmental data on an uplink. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

EXAMPLE EMBODIMENTS

Example 1 includes a method for sending environmental data to a vehicle in transit, wherein the method is performed by a ground system, the method comprising: receiving new environmental data from a plurality of environmental data providers; synthesizing an update template that identifies recommended portions of relevant data that are available to be uploaded for at least one of a plurality of environmental data services; sending the update template to the vehicle using a low-bandwidth connection, wherein the update template is sent by the ground system without first receiving a request for the update template; receiving, from the vehicle, a request for the recommended portions of relevant data; and sending the recommended portions of relevant data to the vehicle in an update package using a high-bandwidth connection.

Example 2 includes the method of Example 1, wherein the update template is synthesized based on at least one preference of an operator of the vehicle.

Example 3 includes the method of any of Examples 1-2, wherein the update template is synthesized based on at least one severity determination for the relevant data.

Example 4 includes the method of any of Examples 1-3, wherein the update package is assembled based on a configurable data size limit, wherein the recommended portions of relevant data are added to the update package, based on priority data, until the configurable data size limit is reached, wherein the update template is synthesized based on the update package.

Example 5 includes the method of Example 4, wherein the priority data comprises a severity determination of a detected weather condition, a preference of an operator of the vehicle, or both.

Example 6 includes the method of any of Examples 1-5, wherein the recommended relevant data is a subset of the new environmental data that describes changes to weather conditions occurring along a route of the vehicle.

Example 7 includes the method of Example 6, wherein the changes to weather conditions are changes occurring from existing environmental data, received at the ground system before departure of the vehicle, to the new environmental data.

Example 8 includes the method of any of Examples 1-7, wherein the recommended relevant data indicated by the update template is for a subset of the plurality of environmental data services.

Example 9 includes the method of any of Examples 1-8, wherein the low-bandwidth connection is a very high frequency (VHF) Aircraft Communications Addressing and Reporting System (ACARS) link, wherein the high-bandwidth connection is a satellite communications (SATCOM) link.

Example 10 includes a ground system for sending environmental data to a vehicle in transit, the ground system comprising: a data analysis module configured to determine relevant data for the vehicle based on new environmental data received at the ground system; an update package assembler configured to assemble an update package based on priority data for the vehicle; a template module configured to synthesize an update template based on the update package, wherein the update template identifies recommended portions of relevant data that are available to be uploaded for at least one of a plurality of environmental data services; a low-bandwidth communication interface configured to send the update template to the vehicle without first receiving a request for the update template; and a high-bandwidth communication interface configured to send, in response to a request from the vehicle, at least a portion of the update package to the vehicle.

Example 11 includes the ground system of Example 10, wherein the priority data comprises at least one preference of an operator of the vehicle.

Example 12 includes the ground system of any of Examples 10-11, wherein the priority data comprises at least one severity determination for the relevant data.

Example 13 includes the ground system of any of Examples 10-12, wherein the update package is assembled based on a configurable data size limit, wherein the recommended portions of relevant data are added to the update package, based on the priority data, until the configurable data size limit is reached.

Example 14 includes the ground system of Example 13, wherein the priority data comprises a severity determination of a detected weather condition, a preference of an operator of the vehicle, or both.

Example 15 includes the ground system of any of Examples 10-14, wherein the relevant data is a subset of the new environmental data that describes changes to weather conditions occurring along a route of the vehicle.

Example 16 includes the ground system of Example 15, wherein the changes to weather conditions are changes occurring from existing environmental data, received at the ground system before departure of the vehicle, to the new environmental data.

Example 17 includes the ground system of any of Examples 10-16, wherein the recommended relevant data indicated by the update template is for a subset of the plurality of environmental data services.

Example 18 includes the ground system of any of Examples 10-17, wherein the low-bandwidth connection is a very high frequency (VHF) Aircraft Communications Addressing and Reporting System (ACARS) link, wherein the high-bandwidth connection is a satellite communications (SATCOM) link.

Example 19 includes a method for sending environmental data to a vehicle in transit, wherein the method is performed by a ground system, the method comprising: receiving new environmental data from a plurality of environmental data providers; determining relevant data that is a subset of the new environmental data, wherein the relevant data describes changes to weather conditions occurring along a route of the vehicle; assembling an update package based on the relevant data and one or more of the following: a severity determination of a detected weather condition, a preference of an operator of the vehicle, and a data size limit; synthesizing, based on the update package, an update template that identifies recommended portions of the relevant data that are available to be uploaded for at least one of a plurality of environmental data services; sending the update template to the vehicle using a low-bandwidth connection, wherein the update template is sent by the ground system without first receiving a request for the update template; receiving, from the vehicle, a request for the recommended portions of relevant data; and sending the recommended portions of relevant data to the vehicle in the update package using a high-bandwidth connection.

Example 20 includes the method of Example 19, wherein the low-bandwidth connection is a very high frequency (VHF) Aircraft Communications Addressing and Reporting System (ACARS) link, wherein the high-bandwidth connection is a satellite communications (SATCOM) link.

What is claimed is:

1. A method, comprising:
   receiving, at a device on a vehicle from a ground system, an update template using a low-bandwidth connection, the update template being sent by the ground system without first receiving a request for the update template, the update template including recommended portions of relevant data;
   transmitting, from the device on the vehicle to the ground system, a request for the recommended portions of the relevant data; and
   in response to transmitting the request, receiving, at the device on the vehicle from the ground system, the recommended portions of the relevant data from the ground system in an update package using a high-bandwidth connection,
   wherein the ground system is configured to:
      receive new environmental data from a plurality of environmental data services; and
      synthesize the update template that identifies the recommended portions of the relevant data that are available to be uploaded for at least one of the plurality of environmental data services.

2. The method of claim 1, wherein the ground system is further configured to:
   iteratively assess priorities for the plurality of environmental data services using one or more of severity determination(s) of portions of the relevant data, pilot preferences, route data, and/or a data size limit;
   iteratively assemble the update package based on the priorities of the plurality of environmental data services; and
   synthesize the update template based on the update package.

3. The method of claim 1, wherein the recommended portions of the relevant data are a subset of the new environmental data that describes changes to weather conditions occurring along a route of the vehicle.

4. The method of claim 3, wherein the changes to weather conditions are changes occurring from existing environmental data, received at the ground system before departure of the vehicle, to the new environmental data.

5. The method of claim 1, wherein the update template includes indications of one or more environmental data services of the plurality of environmental data services that have available updates, and indications of geographical cell(s) and/or altitude(s) for the available updates of the one or more environmental data services.

6. The method of claim 5, further comprising, before the transmitting the request for the recommended portions of the relevant data:
   displaying, on a display of the device, a user interface to display the indications of the one or more environmental data services of the plurality of environmental data services that have available updates, and the indications of the geographical cell(s) and/or altitude(s) for the available updates of the one or more environmental data services;

receiving a selection on the user interface; and in response to receiving the selection, transmitting the request for the recommended portions of the relevant data based on the selection.

7. The method of claim 6, wherein the user interface is configured to display selections to modify the recommended portions of the relevant data by selecting:

portions of the one or more environmental data services; and/or portions of the geographical cell(s) and/or the altitude(s).

8. A system, the system comprising:

at least one memory storing instructions; and at least one processor executing the instructions to perform a process, the process including:

receiving, at a device on a vehicle from a ground system, an update template using a low-bandwidth connection, the update template being sent by the ground system without first receiving a request for the update template, the update template including recommended portions of relevant data;

transmitting, from the device on the vehicle to the ground system, a request for the recommended portions of the relevant data; and in response to transmitting the request, receiving, at the device on the vehicle from the ground system, the recommended portions of the relevant data from the ground system in an update package using a high-bandwidth connection, wherein the ground system is configured to:

receive new environmental data from a plurality of environmental data services; and synthesize the update template that identifies the recommended portions of the relevant data that are available to be uploaded for at least one of the plurality of environmental data services.

9. The system of claim 8, wherein the ground system is further configured to:

iteratively assess priorities for the plurality of environmental data services using one or more of severity determination(s) of portions of the relevant data, pilot preferences, route data, and/or a data size limit;

iteratively assemble the update package based on the priorities of the plurality of environmental data services; and synthesize the update template based on the update package.

10. The system of claim 8, wherein the recommended portions of the relevant data are a subset of the new environmental data that describes changes to weather conditions occurring along a route of the vehicle.

11. The system of claim 10, wherein the changes to weather conditions are changes occurring from existing environmental data, received at the ground system before departure of the vehicle, to the new environmental data.

12. The system of claim 8, wherein the update template includes indications of one or more environmental data services of the plurality of environmental data services that have available updates, and indications of geographical cell(s) and/or altitude(s) for the available updates of the one or more environmental data services.

13. The system of claim 12, the process further includes, before the transmitting the request for the recommended portions of the relevant data:

displaying, on a display of the device, a user interface to display the indications of the one or more environmental data services of the plurality of environmental data services that have available updates, and the indications of the geographical cell(s) and/or altitude(s) for the available updates of the one or more environmental data services;

receiving a selection on the user interface; and in response to receiving the selection, transmitting the request for the recommended portions of the relevant data based on the selection.

14. The system of claim 13, wherein the user interface is configured to display selections to modify the recommended portions of the relevant data by selecting:

portions of the one or more environmental data services; and/or portions of the geographical cell(s) and/or the altitude(s).

15. A non-transitory computer-readable medium storing instructions that, when executed by a processor, cause the processor to perform a method, the method comprising:

receiving, at a device on a vehicle from a ground system, an update template using a low-bandwidth connection, the update template being sent by the ground system without first receiving a request for the update template, the update template including recommended portions of relevant data;

transmitting, from the device on the vehicle to the ground system, a request for the recommended portions of the relevant data; and in response to transmitting the request, receiving, at the device on the vehicle from the ground system, the recommended portions of the relevant data from the ground system in an update package using a high-bandwidth connection, wherein the ground system is configured to:

receive new environmental data from a plurality of environmental data services; and synthesize the update template that identifies the recommended portions of the relevant data that are available to be uploaded for at least one of the plurality of environmental data services.

16. The non-transitory computer-readable medium of claim 15, wherein the ground system is further configured to:

iteratively assess priorities for the plurality of environmental data services using one or more of severity determination(s) of portions of the relevant data, pilot preferences, route data, and/or a data size limit;

iteratively assemble the update package based on the priorities of the plurality of environmental data services; and synthesize the update template based on the update package.

17. The non-transitory computer-readable medium of claim 15, wherein the recommended portions of the relevant data are a subset of the new environmental data that describes changes to weather conditions occurring along a route of the vehicle.

18. The non-transitory computer-readable medium of claim 15, wherein the update template includes indications of one or more environmental data services of the plurality of environmental data services that have available updates, and indications of geographical cell(s) and/or altitude(s) for the available updates of the one or more environmental data services.

19. The non-transitory computer-readable medium of claim 18, further comprising, before the transmitting the request for the recommended portions of the relevant data:
- displaying, on a display of the device, a user interface to display the indications of the one or more environmental data services of the plurality of environmental data services that have available updates, and the indications of the geographical cell(s) and/or altitude(s) for the available updates of the one or more environmental data services;
- receiving a selection on the user interface; and
- in response to receiving the selection, transmitting the request for the recommended portions of the relevant data based on the selection.

20. The non-transitory computer-readable medium of claim 19, wherein the user interface is configured to display selections to modify the recommended portions of the relevant data by selecting:
- portions of the one or more environmental data services; and/or
- portions of the geographical cell(s) and/or the altitude(s).

* * * * *